United States Patent
Iten et al.

(10) Patent No.: US 7,607,107 B2
(45) Date of Patent: Oct. 20, 2009

(54) ON-SCREEN USER INTERFACE DEVICE

(75) Inventors: Tommi J. Iten, Redondo Beach, CA (US); Brian Black, Santa Monica, CA (US); Eric J. Bennett, Los Angeles, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1129 days.

(21) Appl. No.: 10/464,312

(22) Filed: Jun. 18, 2003

(65) Prior Publication Data

US 2004/0070628 A1   Apr. 15, 2004

Related U.S. Application Data

(60) Provisional application No. 60/389,682, filed on Jun. 18, 2002.

(51) Int. Cl.
G06F 3/048 (2006.01)
G06F 3/01 (2006.01)

(52) U.S. Cl. .................. 715/810; 715/831; 725/37; 725/39

(58) Field of Classification Search .............. 715/810
See application file for complete search history.

(56) References Cited

U.S. PATENT DOCUMENTS

| | | | | |
|---|---|---|---|---|
| 5,353,121 A * | 10/1994 | Young et al. | .................. | 725/52 |
| 5,485,197 A * | 1/1996 | Hoarty | .................. | 725/37 |
| 5,629,733 A * | 5/1997 | Youman et al. | .................. | 725/53 |
| 5,673,401 A * | 9/1997 | Volk et al. | .................. | 725/139 |
| 5,677,708 A * | 10/1997 | Matthews et al. | .................. | 345/684 |
| 5,689,663 A * | 11/1997 | Williams | .................. | 715/721 |
| 5,724,492 A * | 3/1998 | Matthews et al. | .................. | 345/419 |
| 5,805,167 A * | 9/1998 | van Cruyningen | .................. | 715/808 |
| 5,822,123 A * | 10/1998 | Davis et al. | .................. | 725/43 |
| 5,850,218 A * | 12/1998 | LaJoie et al. | .................. | 725/45 |
| 5,886,690 A * | 3/1999 | Pond et al. | .................. | 715/720 |
| 5,933,141 A * | 8/1999 | Smith | .................. | 725/39 |
| 5,956,025 A * | 9/1999 | Goulden et al. | .................. | 715/716 |
| 6,037,933 A * | 3/2000 | Blonstein et al. | .................. | 715/721 |
| 6,141,003 A * | 10/2000 | Chor et al. | .................. | 715/719 |
| 6,151,059 A * | 11/2000 | Schein et al. | .................. | 725/37 |
| 6,182,098 B1 * | 1/2001 | Selker | .................. | 715/526 |
| 6,182,287 B1 * | 1/2001 | Schneidewend et al. | .................. | 725/48 |
| 6,195,692 B1 * | 2/2001 | Hsu | .................. | 725/110 |
| 6,208,335 B1 * | 3/2001 | Gordon et al. | .................. | 715/721 |
| 6,211,921 B1 * | 4/2001 | Cherian et al. | .................. | 348/565 |
| 6,262,722 B1 * | 7/2001 | Allison et al. | .................. | 725/39 |
| 6,266,098 B1 * | 7/2001 | Cove et al. | .................. | 348/563 |
| 6,411,307 B1 * | 6/2002 | Rosin et al. | .................. | 715/716 |

(Continued)

OTHER PUBLICATIONS

Pointroll et al. www.pointroll.com Nov. 2002.*

*Primary Examiner*—Weilun Lo
*Assistant Examiner*—Steven B Theriault

(57) ABSTRACT

A navigation device that allows a user to quickly navigate a television environment that provides multiple services, features and options. The navigation device of the present invention is a graphical user interface and minimum of commands from a remote control to navigate through the services provided. The present invention is made up of three basic parts; an anchor, menus, and control bars. An anchor is the base or foundation of the device and includes branding, a progress bar for indicating the number of available menus, and other services such as the current date and time. Other device elements extend from the anchor.

25 Claims, 9 Drawing Sheets

U.S. PATENT DOCUMENTS

| | | | |
|---|---|---|---|
| 6,411,337 B2 * | 6/2002 | Cove et al. | 348/563 |
| 6,421,067 B1 * | 7/2002 | Kamen et al. | 715/719 |
| 6,463,586 B1 * | 10/2002 | Jerding | 725/37 |
| 6,526,577 B1 * | 2/2003 | Knudson et al. | 725/40 |
| 6,538,672 B1 * | 3/2003 | Dobbelaar | 715/810 |
| 6,571,390 B1 * | 5/2003 | Dunn et al. | 725/52 |
| 6,678,891 B1 * | 1/2004 | Wilcox et al. | 725/42 |
| 6,690,391 B1 * | 2/2004 | Proehl et al. | 715/720 |
| 6,704,028 B2 * | 3/2004 | Wugofski | 715/719 |
| 6,756,997 B1 * | 6/2004 | Ward et al. | 715/810 |
| 6,772,394 B1 * | 8/2004 | Kamada | 715/513 |
| 6,978,473 B1 * | 12/2005 | Nsonwu et al. | 725/52 |
| 7,036,091 B1 * | 4/2006 | Nguyen | 715/834 |
| 7,036,092 B2 * | 4/2006 | Sloo et al. | 715/841 |
| 7,065,709 B2 * | 6/2006 | Ellis et al. | 715/719 |
| 7,076,734 B2 * | 7/2006 | Wolff et al. | 715/720 |
| 7,096,431 B2 * | 8/2006 | Tambata et al. | 715/841 |
| 7,117,440 B2 * | 10/2006 | Gordon et al. | 715/721 |
| 7,155,674 B2 * | 12/2006 | Breen et al. | 715/719 |
| 7,155,675 B2 * | 12/2006 | Billmaier et al. | 715/720 |
| 7,159,177 B2 * | 1/2007 | Billmaier et al. | 715/720 |
| 7,240,289 B2 * | 7/2007 | Naughton et al. | 715/740 |
| 2003/0001898 A1 * | 1/2003 | Bernhardson | 345/786 |
| 2003/0001907 A1 * | 1/2003 | Bergsten et al. | 345/853 |
| 2003/0090524 A1 * | 5/2003 | Segerberg et al. | 345/786 |
| 2003/0095149 A1 * | 5/2003 | Fredriksson et al. | 345/797 |
| 2003/0169302 A1 * | 9/2003 | Davidsson et al. | 345/810 |
| 2004/0008229 A1 * | 1/2004 | Hultcrantz | 345/810 |
| 2004/0140995 A1 * | 7/2004 | Goldthwaite et al. | 345/716 |
| 2005/0257166 A1 * | 11/2005 | Tu | 715/787 |
| 2006/0015560 A1 * | 1/2006 | MacAuley et al. | 709/206 |
| 2006/0026078 A1 * | 2/2006 | King et al. | 705/26 |
| 2006/0026647 A1 * | 2/2006 | Potrebic et al. | 725/53 |
| 2006/0218588 A1 * | 9/2006 | Kelts | 725/39 |
| 2006/0236342 A1 * | 10/2006 | Kunkel et al. | 725/52 |

* cited by examiner

ON-SCREEN USER INTERFACE DEVICE

RELATED APPLICATION

The present invention claims benefit of Provisional Application No. 60/389,682, filed Jun. 18, 2002, entitled "ON-SCREEN USER INTERFACE DEVICE" under 35 U.S.C. § 119(e)(1).

TECHNICAL FIELD

The present invention relates generally to a system and method for on-screen navigation of multiple services, features and options for a television environment, and more particularly to a graphical user interface for navigation of the television environment.

BACKGROUND OF THE INVENTION

Television viewing has become increasingly sophisticated in the services, features and options provided by broadcasters, such as live television, digitally recorded video, Internet services, radio services to name just a few. Unfortunately, navigation of the services features and options becomes more complicated and therefore, more difficult for the average user to enjoy the benefits of the improved services.

There is a need for a system and method that simplifies the navigation to improve a user's ability to benefit from the enhanced services and improve their viewing experience.

SUMMARY OF THE INVENTION

The present invention is a navigation device that allows a user to quickly navigate a plurality of television environments that provide multiple services, features and options. The navigation device of the present invention is a graphical user interface and minimum of commands from a remote control to navigate through the services provided.

It is an object of the present invention to provide quick and easy navigation through a multitude of services, features and options available within a television environment. It is another object of the present invention to provide a shortcut for accessing services, features and options of the television environment with quick and direct navigation. It is a further object of the present invention to use a minimum amount of screen real estate to display the navigation device of the present invention.

Other objects and advantages of the present invention will become apparent upon reading the following detailed description and appended claims, and upon reference to the accompanying drawings.

BRIEF DESCRIPTION OF THE DRAWINGS

For a more complete understanding of this invention, reference should now be had to the embodiments illustrated in greater detail in the accompanying drawings and described below by way of examples of the invention. In the drawings.

DETAILED DESCRIPTION OF PREFERRED EMBODIMENTS

Figure 1:
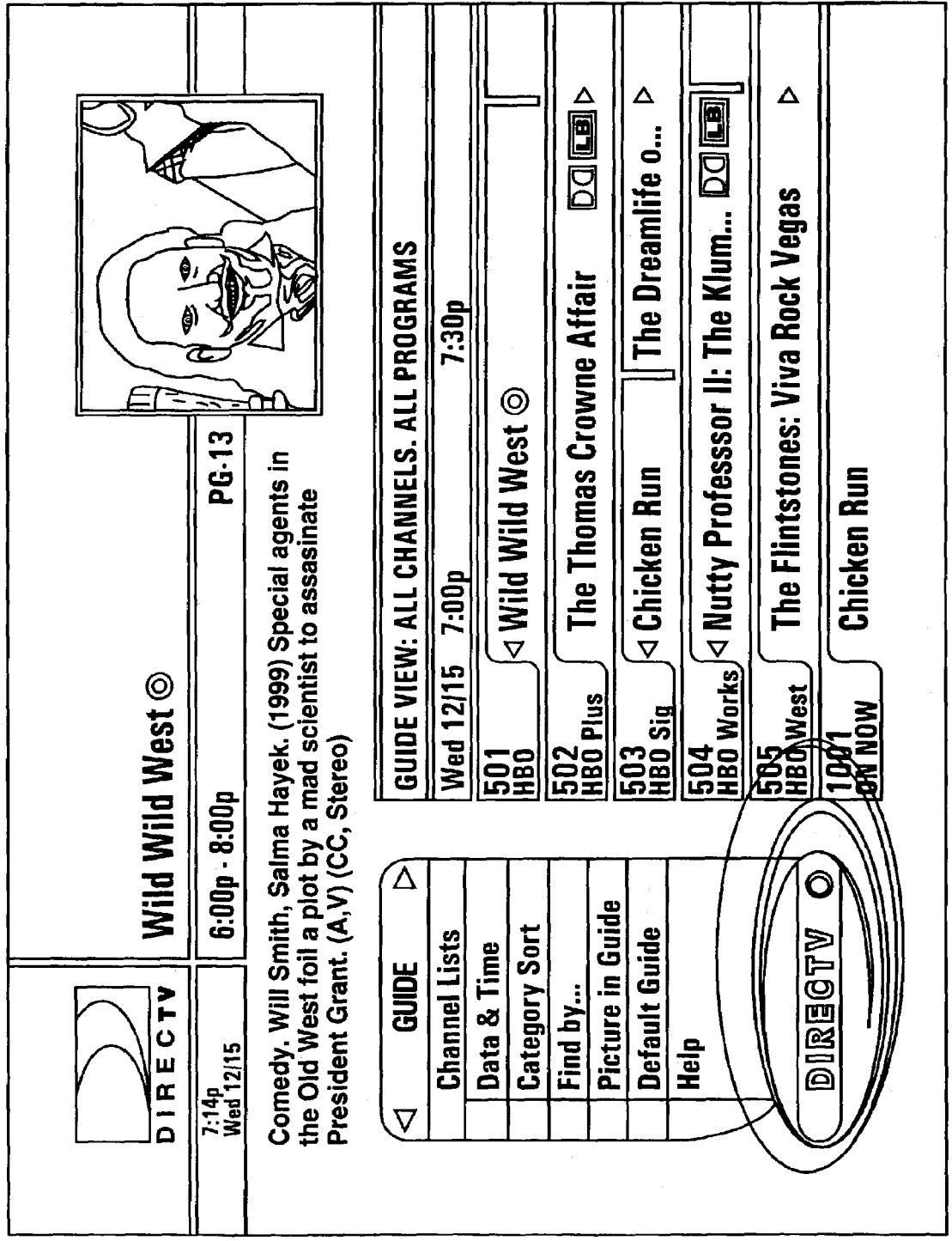
FIG. 1 is a diagram of a menu for a Program Guide television environment.

The present invention is an on-screen user interface navigation device, hereinafter device, that aids a user in navigating a multitude of services, features and options provided on a display medium, such as in a broadcast television system. Television systems are becoming increasingly sophisticated and include multiple television environments having services and features such as live television, recorded television, and Internet services, among others. Some examples include, but are not limited to, "Live TV", "Internet", "Recorded TV", "NFL Sunday Ticket", etc. This list is by no means exhaustive and is continuing to expand. FIGS. 1 though 6 are examples of menus that expand from the anchor according to the present invention and are related to the television environments program guide, Live TV, Internet, Sunday Ticket, music and recorded video respectively.

The device of the present invention is always instantly available and provides quick access to other parts of the user interface, various functions and relevant information. These menus are presented for example purposes only and should not be considered exhaustive of the options, presentation and subjects available. One skilled in the art is capable of determining additional subjects, selections, and/or presentation without departing from the scope of the present invention. In addition, when new television services are added, the device of the present invention is easily modified to include the new services.

Figure 7:
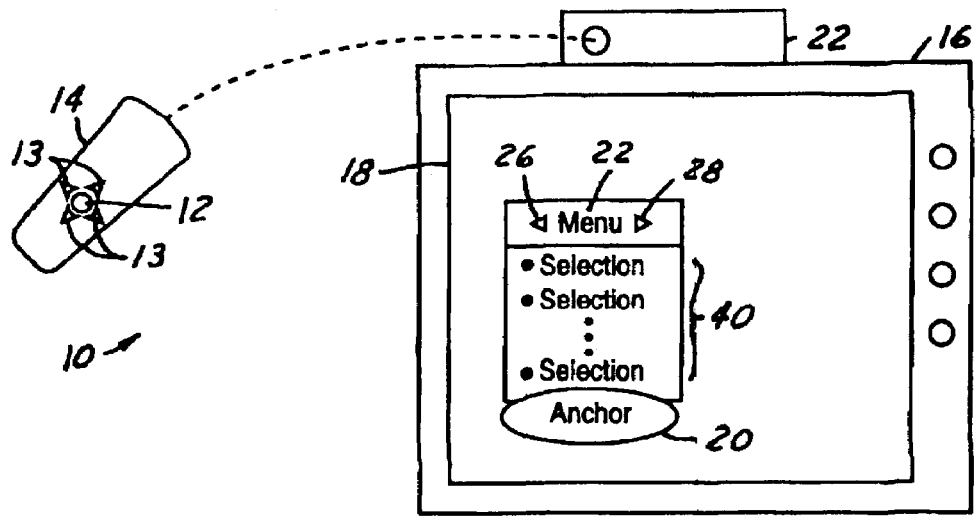
FIG. 7 is a block diagram of the present invention.

Referring now to FIG. 7, the device 10 is activated by a single button 12 on a remote control 14. The device 10 of the present invention overlays whatever is currently on the screen 18 of the television 16 using a minimum of screen space so as not to completely obstruct the screen 18. The device 10 is capable of "focusing". Focusing in this context means the user is specifically navigating within a specific environment 24 and cannot act on anything in the background of the television screen 18 until the navigation device of the present invention is cleared, or dismissed, from the screen 18.

According to the present invention, one menu 22 is displayed at a time. The menu 22 has forward and backward arrows 26, 28 indicating there are more menus to select from, each menu 22 corresponding to a respective television environment 24. The device 10 has an anchor 20 having a number of menus 22 with individual selections 40 for each menu 22. The selections are numbered 1 through N in FIG. 7, and are geared to each specific television environment 24. In another embodiment to be described later herein, the menus are customizable by the user.

Figure 3:
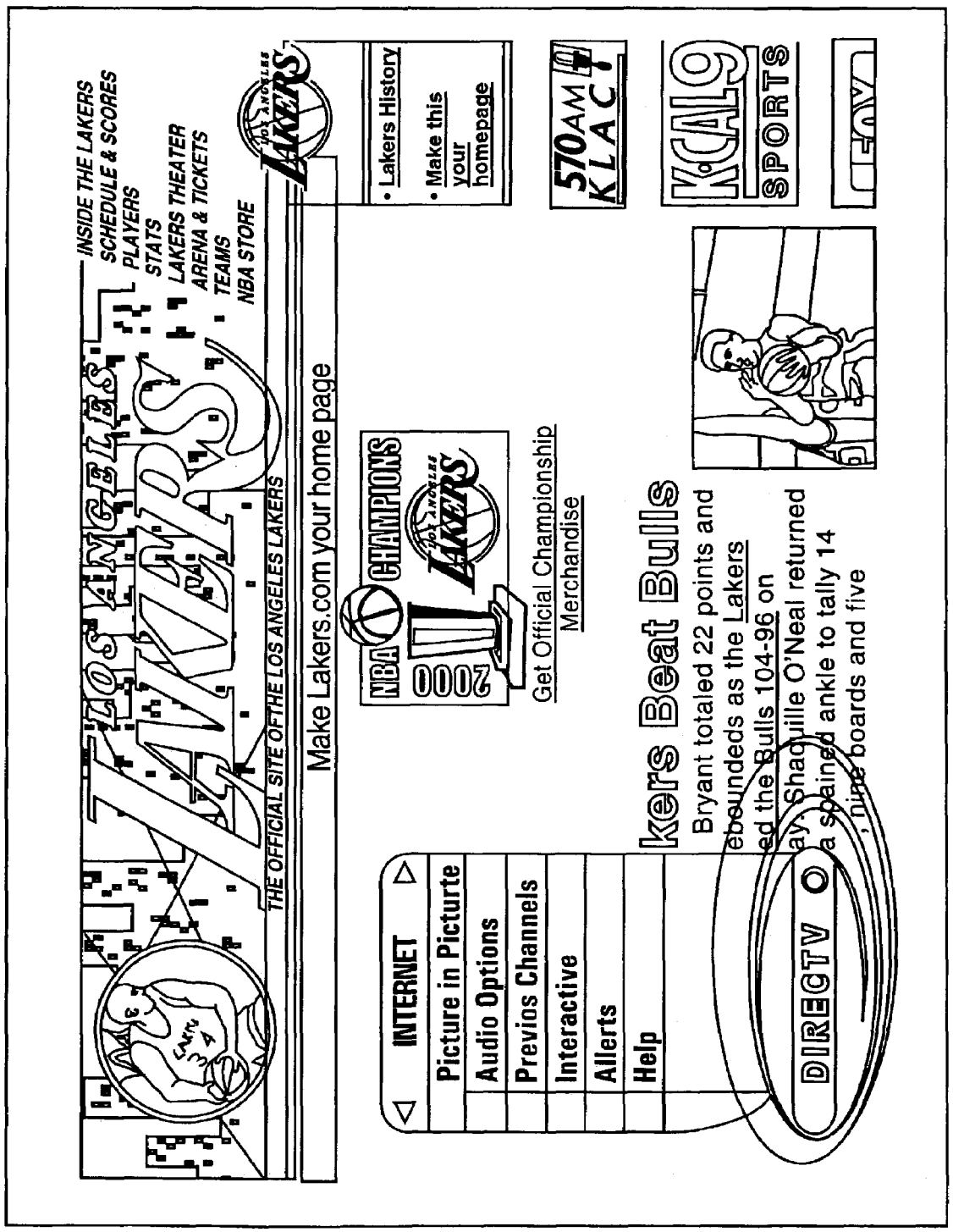
FIG. 3 is a diagram of a menu for Internet television environment.

The device 10 is "smart" in that, when a user accesses it, such as by pressing a dedicated button 12 on the remote control, the device 10 recognizes the location within the television environment 24 that the user is currently in and appears showing a menu 22 related to that environment. For example, if the user is in the "program guide", as shown in FIG. 1, activation of the device 10 would display a "Guide" menu 100 from the anchor 20. There are several selections 40 available in the guide menu 22 for a user to choose from. If a user is surfing the Internet, as shown in FIG. 3, on their television screen, the software of the present invention would recognize this current television environment location and when the user initiates the navigation device, the device displays a menu titled internet that includes Internet related menu options.

Figure 2:
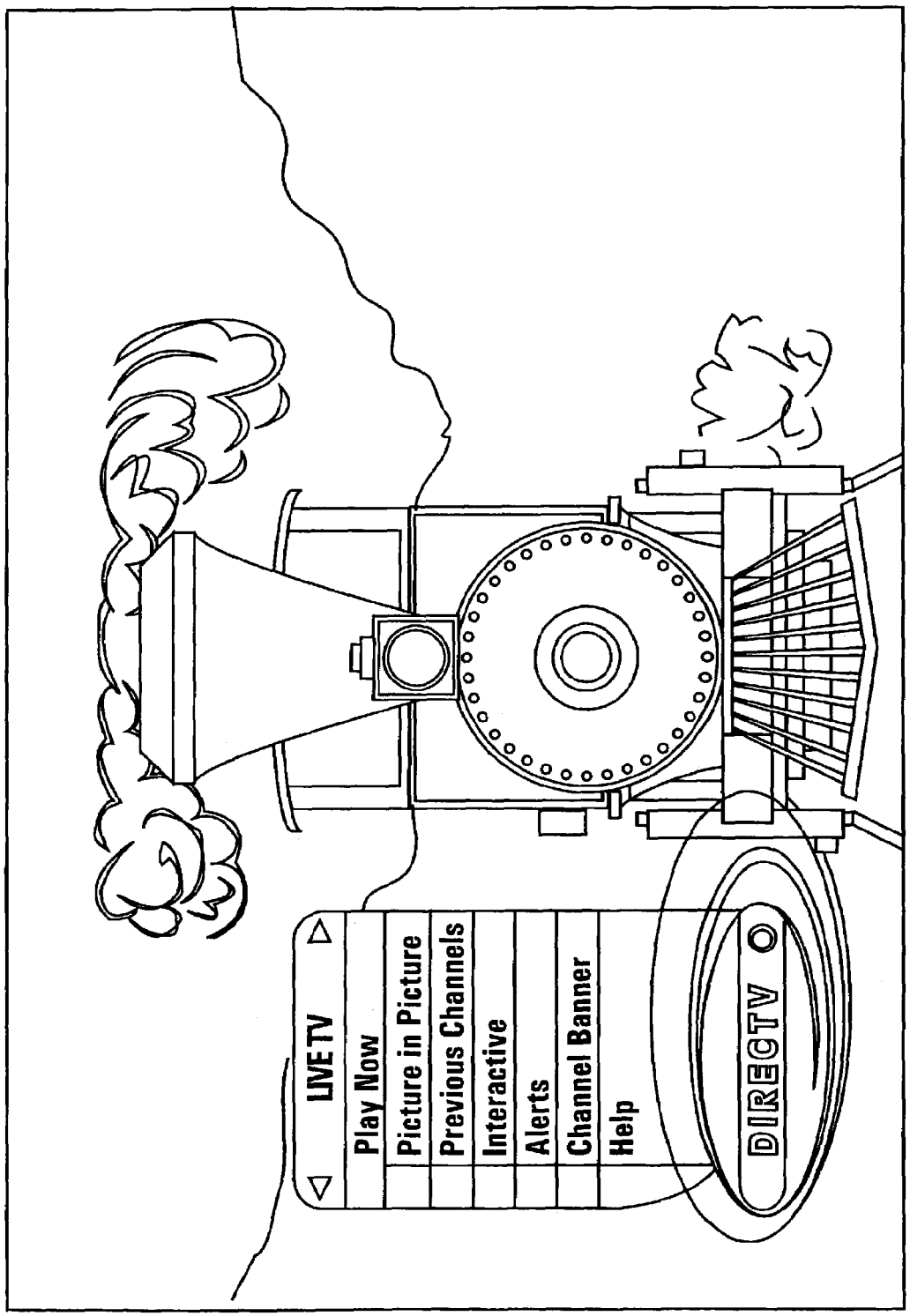
FIG. 2 is a diagram of a menu for Live TV television environment.

Additionally, the device maintains a state when repeatedly accessed from the same location. For example, a user in a "Live TV" environment would call up the device and the "Live TV" menu, shown in FIG. 2, would be displayed. The user navigates to the "NFL Sunday Ticket" menu, shown in FIG. 4, to get scores from various football games, and then clears the device and remains in "Live TV". Upon calling up the device again, while still in "Live TV", the device 10 would display showing the "NFL Sunday Ticket" menu, which was the last menu displayed while the device was active. If the user is in "Live TV", navigates to the "Sunday Ticket" menu, dismisses the device and later goes from the "Live TV" environment to the "Internet" environment, when the device 10 is called up again, it would display the "Internet" menu as a result of the user's change in location.

Figure 8:
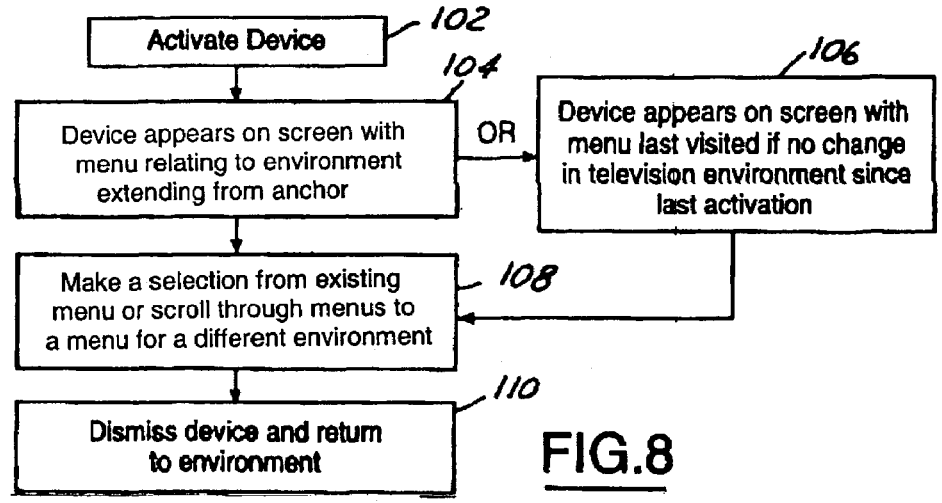
FIG. 8 is a block diagram of the arrangement of the menus and options relative to the anchor.

Referring to FIG. 8, a flowchart shows the flow of activation and dismissal of the device from the television screen. The device is activated 100 by any method, such as pressing a dedicated button on a remote control. The device appears 104 on screen with a related menu. The related menu may be the menu directly corresponding to the existing television environment. In the alternative, the menu displayed will be related to a television environment other than the existing environment 106. A menu related to a television environment other than the existing television environment will appear when the device has been activated previously within the same environment, but scrolled to display a menu related to a television environment other than the existing television environment, the device will display the menu last visited. The device remembers the last menu visited when there has been no change in the television environment since the device was last activated. For example, in FIG. 4, the television environment in the background is live television, yet the Sunday Ticket menu is displayed.

In any event, the user is now actively using the device and will make a selection 108 from the menu, either the existing menu or a menu the user has scrolled to reach. Any desired options are selected from the menu's options list. When ready, the user will dismiss the device 110 and return to the television environment.

Referring back to FIG. 7, the present invention applies to a system including an integrated receiver/decoder 22 for the television 16 and combines a wide variety of home entertainment systems, such as television, digital video recording, Internet, etc., into a single, easily navigable system. The device 10 is easy to use and offers many useful options at the touch of a button 12 on a remote control 14 to help a user navigate the multitude of services. The device 10 provides a shortcut for accessing useful functions and information within a specific section of a television environment as well as quick and direct navigation to other sections of the television environment as well as other television environments.

The device 10 of the present invention requires only a minimal amount of screen real estate so that viewing is not obscured when it is used. Further the user does not need to leave their location in the television environment to access a section of the user interface. The device is organized so that functions and options are grouped together in individual menus that are contextual. For example, upon pressing the remote control button 12 that brings the device 10 on screen 18, the device 10 appears showing the menu that is relevant to the user's location in the TV environment.

The present invention is made up of three basic parts, as is shown in block diagram form in FIG. 7. The three parts include an anchor 20, menus 22, and control bars 40 for containing available selections or options in each menu 22. The anchor 20 is the base or foundation of the device 10 and may include branding such as a logo (for example, a DirecTV™ logo or trademark) or advertisements, a progress bar for indicating the number of available menus 22, and other services such as the current date and time. The menu 22 extends from the anchor 20 and a new menu 22 is displayed when a user scrolls to each menu 22(1-N) using navigation buttons 13 on the remote control (RC) 14.

Figure 9:
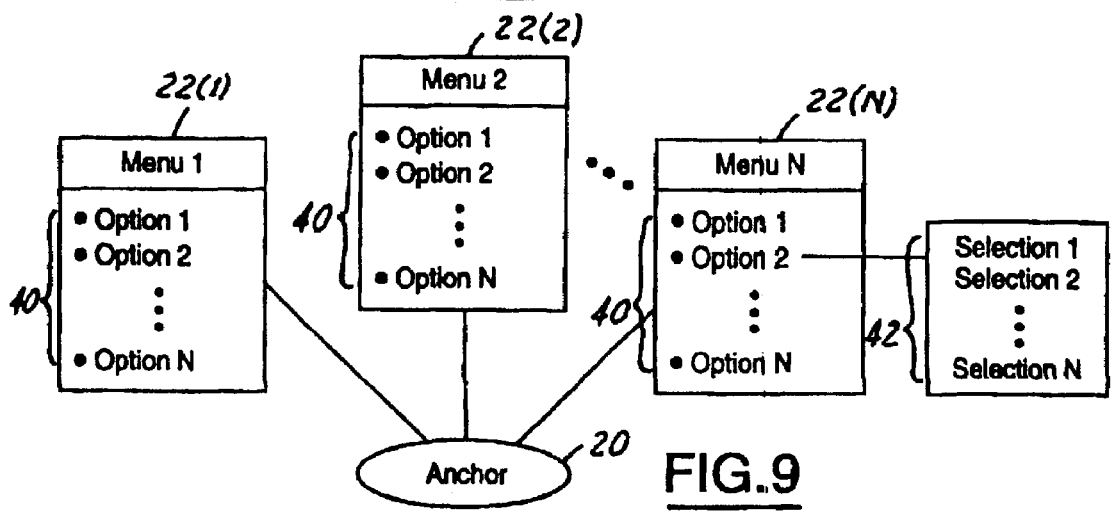
FIG. 9 is a flowchart of the activation of the present invention.

Referring to FIG. 9, where like elements have the same reference numbers as shown in FIG. 7, an overview of the makeup of the menus 22(1) through 22(N) and their relationship to the anchor 20 and the options 40 are shown. Each menu displays a list of several options 40 per menu. The menus 22(1) through 22(N) as well as the options 40 are scrollable as by selecting arrow button on the remote control. It should be noted that FIG. 9 shows the relationship between the menus and the anchor for example purposes. It should be noted that the device of the present invention displays only one menu at a time as the user scrolls through them to maintain the use of a minimum of screen space.

Referring still to FIG. 8, the on-screen menu 22(N) is typical of what options are available at each menu. The menu 22(N) contains all options 40 available relating to that particular menu. However, the device will display a maximum number of options at once due to limited screen space. So for example, only seven options may be displayed at once, but as the list is scrolled through, the device will systematically display the other options available while replacing others that are displayed. The list is continuously scrollable, so that once the user returns to the starting point, the list repeats itself for the user.

Figure 4:
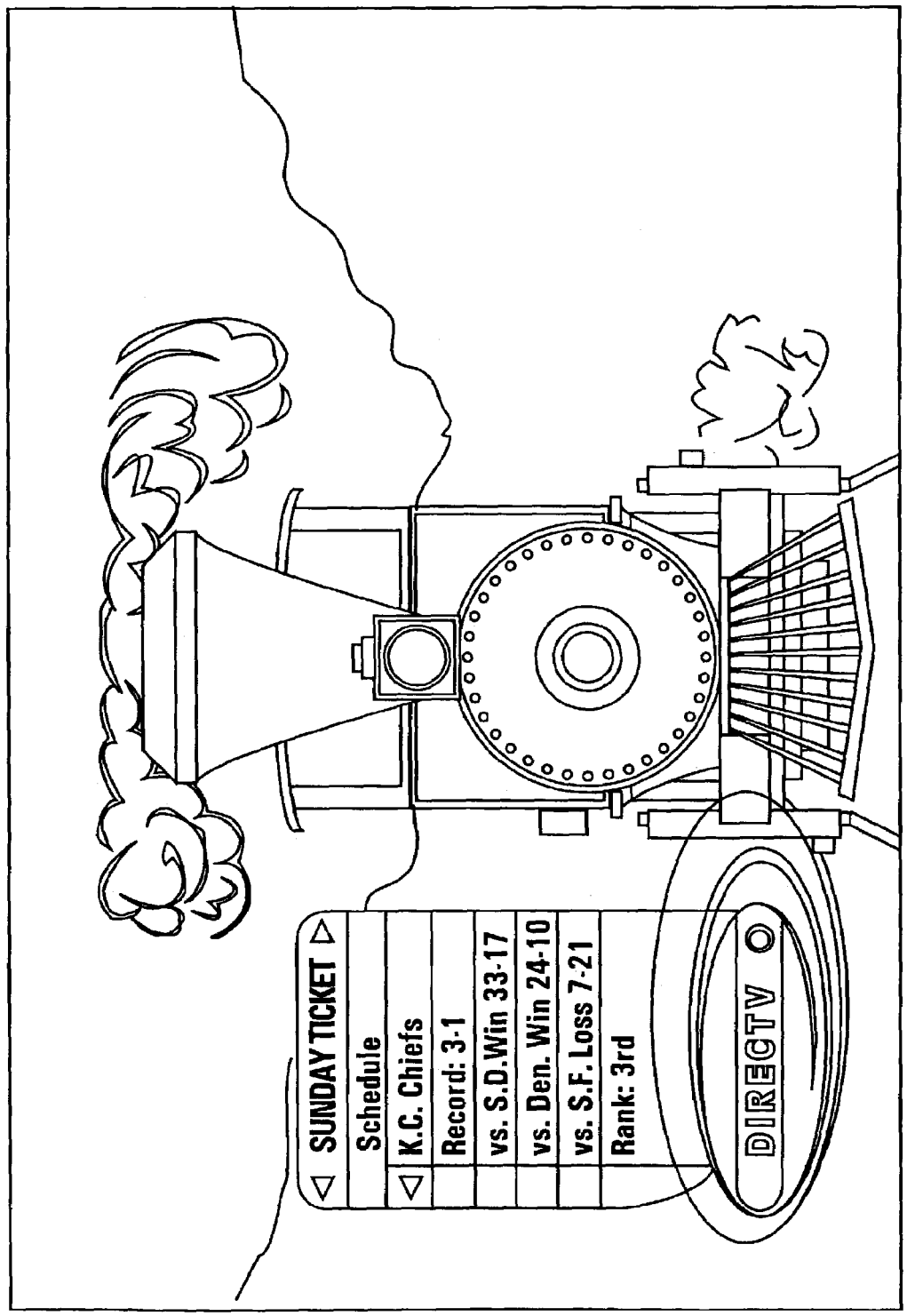
FIG. 4 is a diagram of a menu for a subject based "Sunday Ticket" television environment.

The menus can be designed and displayed in a variety of ways. For example, a menu may offer options that are based around a particular context or subject. Referring back to FIG. 2, a context menu might include a "Live TV" menu which offers the user options related to watching television, such as turning on or off any message alerts that appear, turning on or off a picture-in-picture window, quick access to the last few channels tuned into. An example of a subject menu would be an "NFL menu", as shown in FIG. 4, which offers information on selected teams, NFL schedules, scores, and more. The exact content and look of the menus are too numerous to mention herein and will constantly be changing and updated as new services become available. One skilled in the art is capable of including desired content on a menu without departing from the scope of the present invention.

Once selected, the options within a menu will serve many purposes. For example, a selection may take the user to another location, activate a feature, or open a sub-menu below the selected option revealing related information or choices.

A user can navigate to the next available menu and cycle through all the available menus, thus cycling through will eventually bring the user back to the initial menu.

Figure 5:
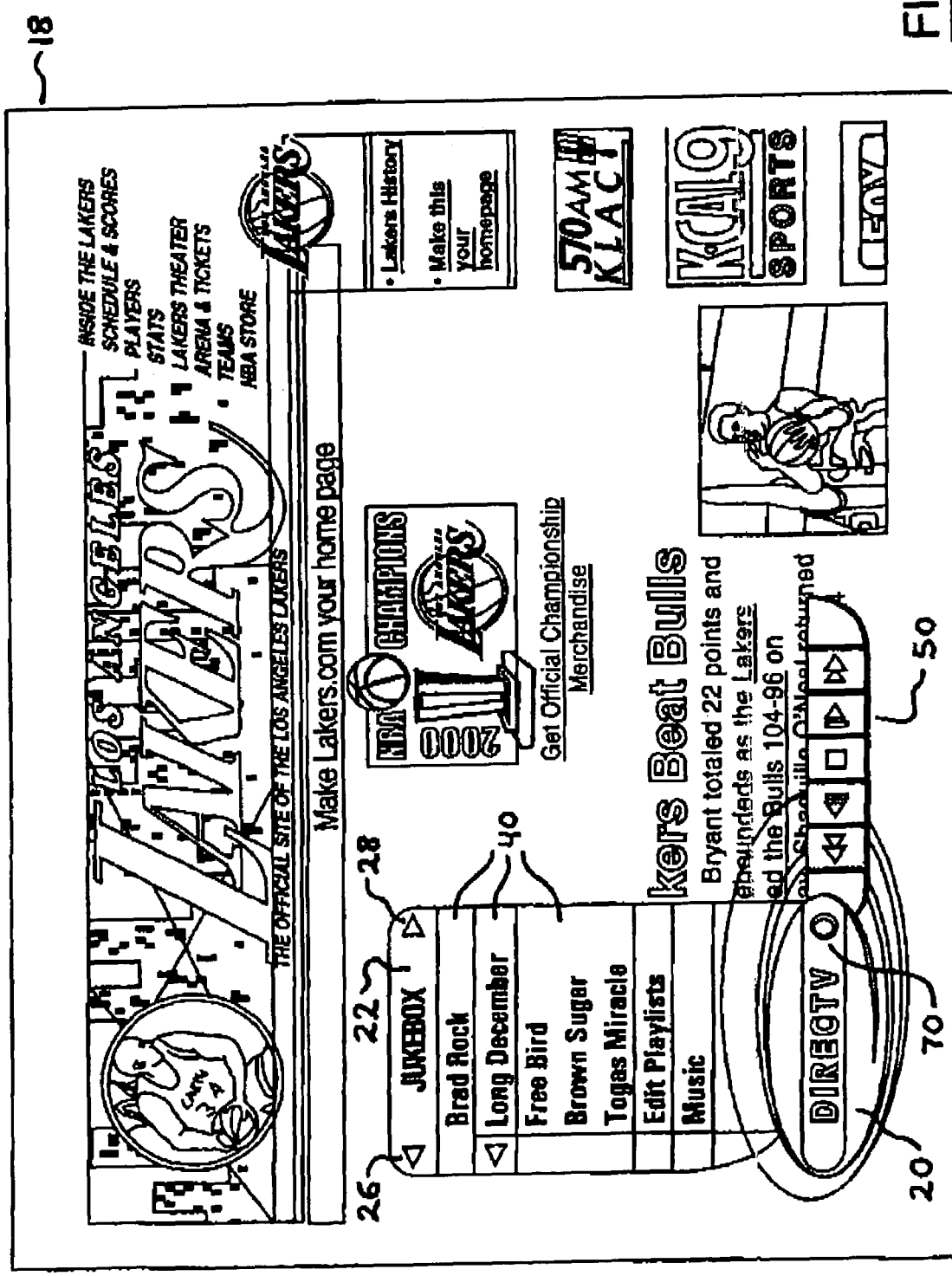
FIG. 5 is a diagram of a menu related for music availability in a television environment.
Figure 6:
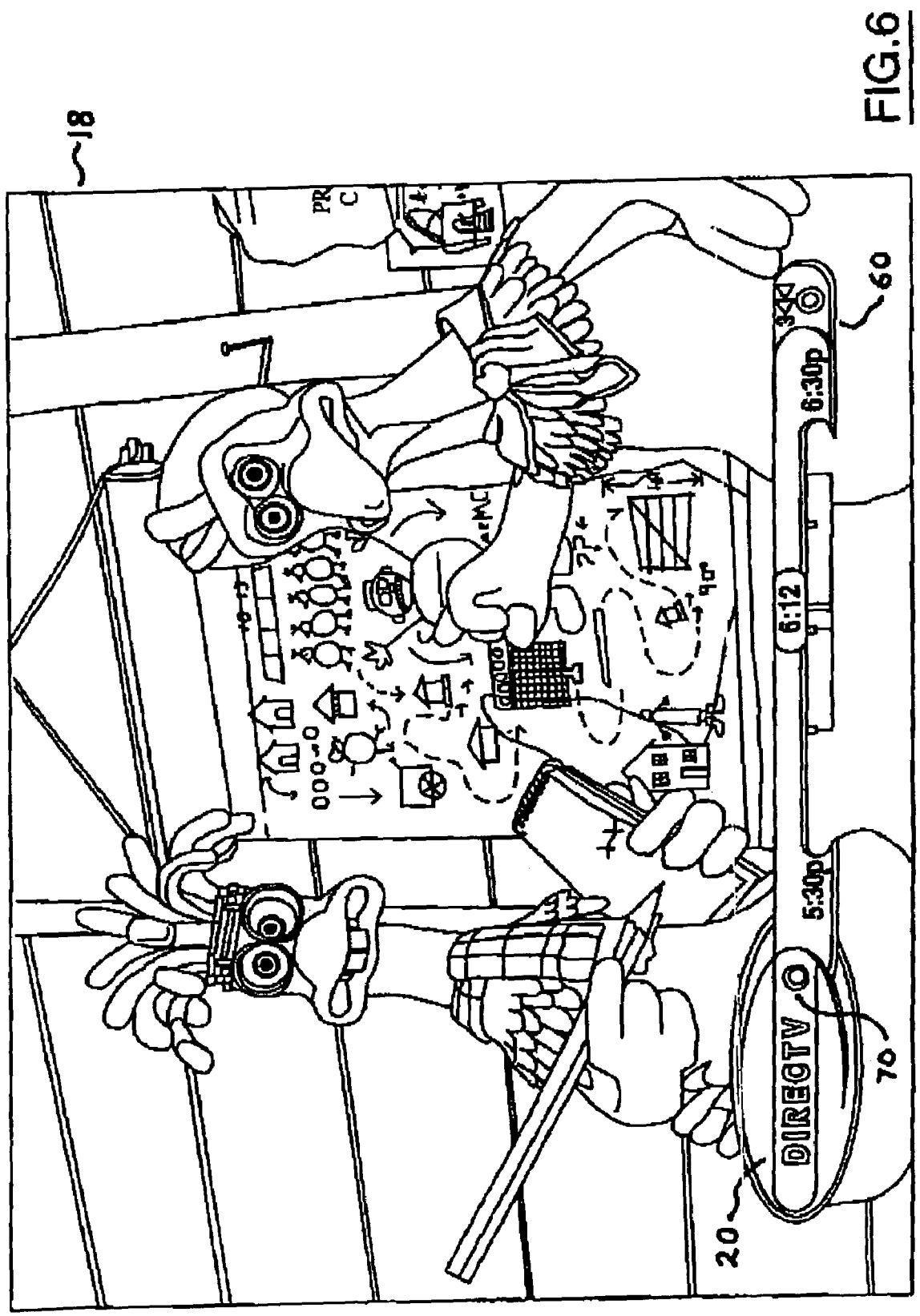
FIG. 6 is a diagram of a menu related to recorded video from a television environment.

Control bars, selections, or options 40 are horizontal bars that extend from the anchor 20, as seen in FIGS. 1 through 6, and allow for control of various media or other currently undetermined assets in the television environment. Control bars 40 may also be applicable to integrated receiver/decoders (IRDs) that include a hard drive for storing recorded content. For example, a specific type of control bar 40 such as a video control bar 60 may give a visual indication of where a user is in a recorded or cached program as well as what functions (fast forward, record, etc.) are being used to manipulate the video, as shown in FIG. 6. FIG. 5 shows an example of a music control bar 50 that allows the user to control recorded music content with options such as Play, Fast Forward, Pause, Reverse, Record, and more. Other control bars may become applicable as the television environments expand in services and features, and as new television environments become available.

Referring again to FIGS. 1-7, all elements 22, 50, and 60 of the device 10 of the present invention extend and pivot from the oblong-shaped anchor 20. For example, when the device 10 is initially summoned for use, the anchor 20 appears onscreen and the appropriate contextual menu 22 transitions out from an axis point 70 on the anchor 20 until the menu 22 reaches a vertical position. When a user moves between menus 22(1-N), each new menu 22 appears using this "cycling" transition. Upon reaching a vertical position, the new menu 22 replaces the prior menu 22. As shown in FIGS. 1-5, each menu 22 is generally shaped so as to somewhat visibly resemble a knife blade. As further shown in FIG. 5, the music control bar 50 is also shaped so as to somewhat resemble a knife blade. In FIG. 6, however, the video control bar 60 is alternatively shaped so as to somewhat resemble a bottle opener or a can opener. In this way, therefore, the anchor 20 and elements 22, 50, and 60 visibly resemble and operatively move on the screen 18 of the television 16 somewhat like a conventional pocketknife or a Swiss Army knife.

Subject based menus in the device, such as the "Sunday Ticket" menu, can pull information from different sources to be displayed on screen as options are selected from the device. For example, information may be supplied from sources such as direct broadcast via satellite, memory within the box like a hard drive, RAM, or flash, and a backchannel (i.e., analog phone line or digital broadband connection). Based on graphics capability of the hardware in the integrated receiver/decoder 22, the device may be generated at any level of the box's software, as from a high level such as Flash to a low level such as C or C++.

Figure 10:
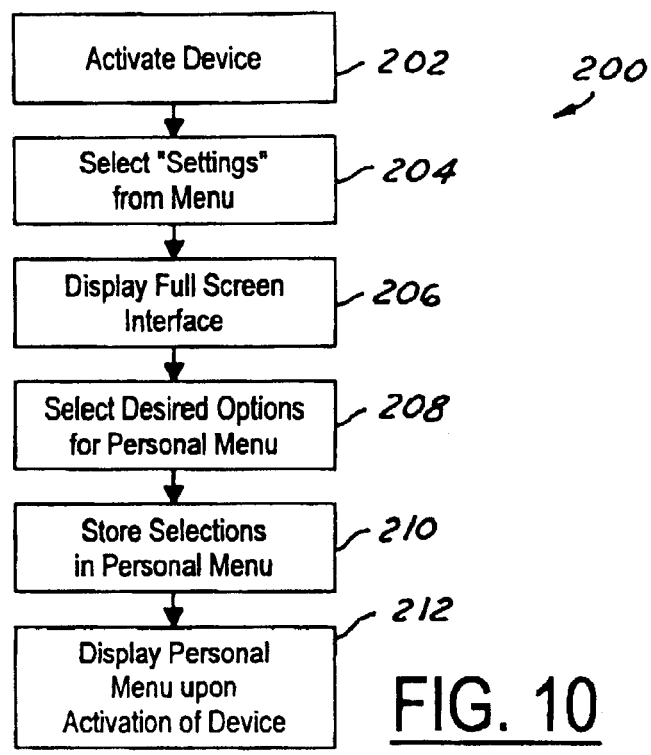
FIG. 10 is a flowchart of the customizable option of one embodiment of the present invention.

In another embodiment, the menus and their selections are customizable by the user. FIG. 10 shows a flow chart of the device of the present invention having customizable menus. In order to customize, or personalize, a menu, the user will activate 202 the device. The user selects 204 the "settings" option from the menu. A full screen interface is displayed 206 and the user selects 208 the desired options from the full screen interface displayed as a type of master menu. The master menu contains all of the selections available to a user. The selections are stored 210 in a "personal" menu and are displayed 212 when the device is activated.

Figure 11:
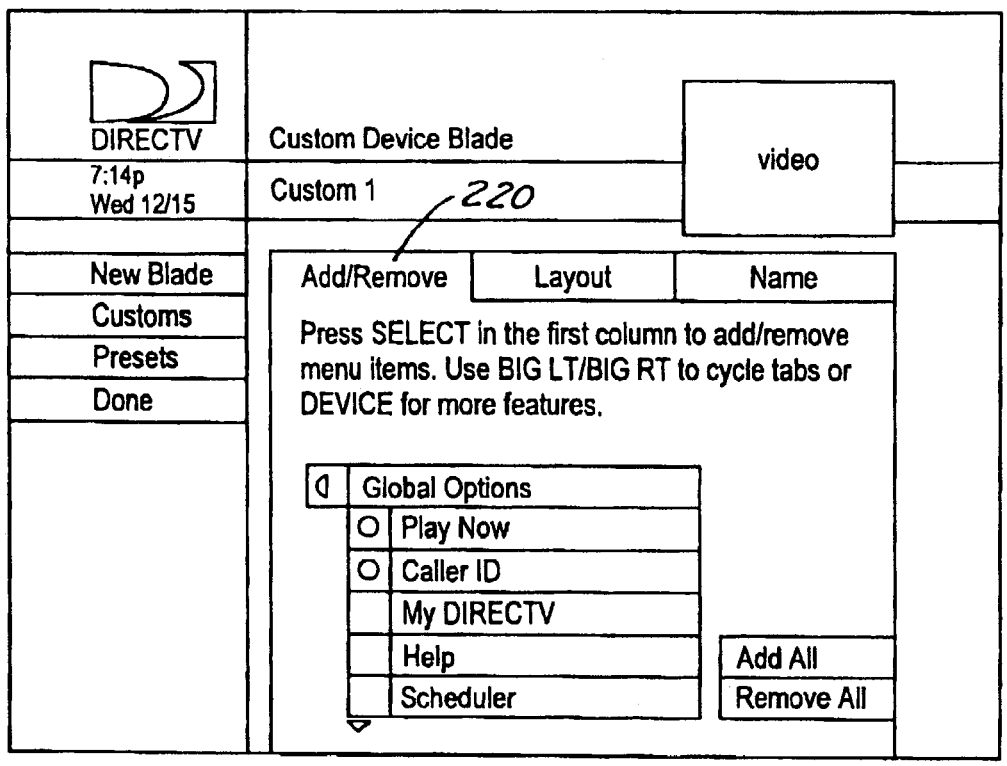
FIG. 11 is an example of an on-screen interface design for the customizable option of the present invention.
Figure 12:
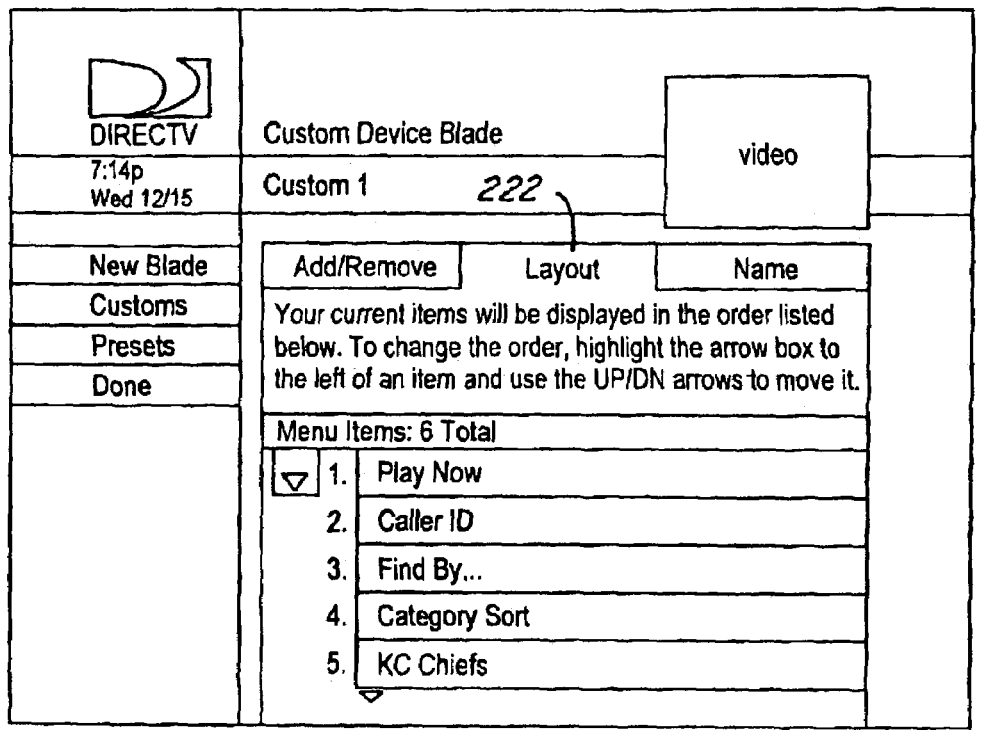
FIG. 12 is another example of an on-screen interface design for the customizable option of the present invention.
Figure 13:
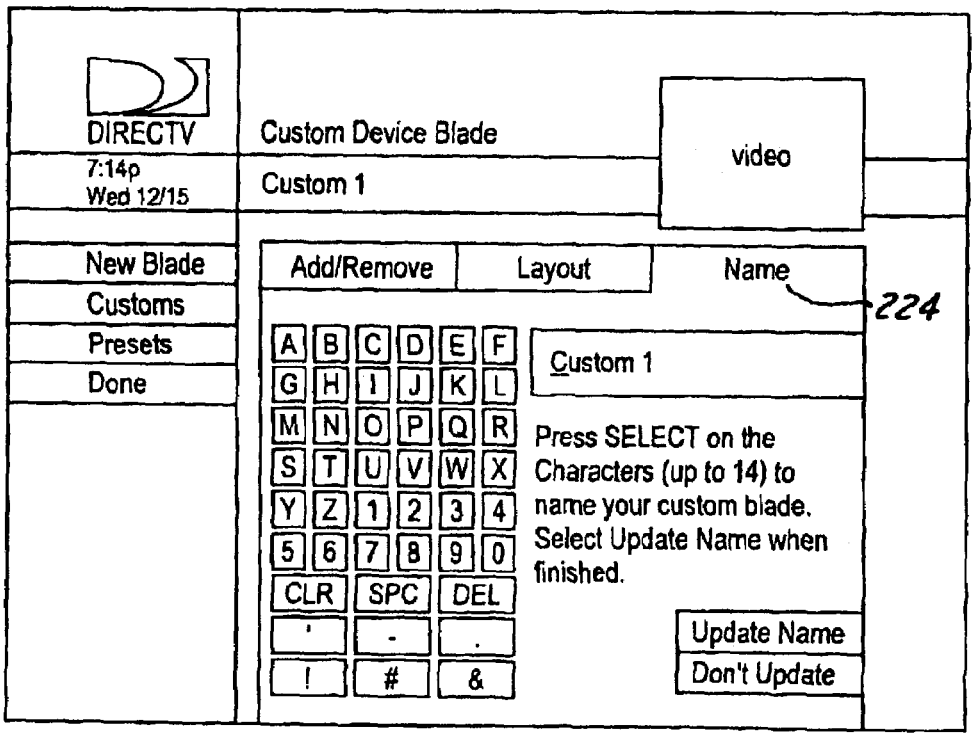
FIG. 13 is another example of an on-screen interface design for the customizable option of the present invention.

FIGS. 11, 12 and 13 are depictions of example interface screens. It should be noted that the selections shown in FIGS. 11, 12 and 13 are for example purposes only and in no way limit the invention to the selections shown. The user would select from add/remove options 220 which may include options from all of the available menu options in a list form. The user can scroll through the list and select the desired option. In another example shown in FIG. 12, a layout menu 222 contains the selections and allows a user to move them into a desired order so they are displayed as desired by the user. In FIG. 13 another example is shown which allows the user to name the customized menu using a name menu 224.

The invention covers all alternatives, modifications, and equivalents, as may be included within the spirit and scope of the appended claims.

What is claimed is:

1. An on-screen navigation device for a media system having a display medium, a remote control, and an integrated receiver/decoder, said on-screen navigation device comprising:

an oblong anchor that is selectively displayable on and removable from display medium upon demand through said remote control, said anchor having an axis point at one end; and a plurality of elongate menus that are each selectively pivotable about and extendable from said axis point of said anchor so as to be singularly displayed on said display medium upon demand through said remote control.

2. An on-screen navigation device as claimed in claim 1, wherein said anchor an advertisement banner that is displayed thereon when said anchor is selectively displayed on said display medium.

3. An on-screen navigation device as claimed in claim 1, wherein said navigation device further comprises means for scrolling through said menus and also means for scrolling through options available in said menus by using said remote control.

4. An on-screen navigation device as claimed in claim 1, wherein said menus contain subject matter corresponding to live television broadcasts, Internet services, informational services, digitally recorded video, and a program guide.

5. An on-screen navigation device as claimed in claim 1, wherein said menus at least one personalized menu having selections that are selected and set by a user through selections made from a master menu.

6. An on-screen device for navigating a plurality of television environments in a direct-broadcast satellite television system that includes an integrated receiver/decoder, a television, and a remote control for communicating with said integrated receiver/decoder and also manipulating said television environments that are displayed on the screen of said television, said on-screen device comprising:

an oblong anchor that is selectively displayable on and removable from said screen upon demand through said remote control, said anchor having an axis point at one end;

a plurality of elongate menus that are each selectively pivotable about and extendable from said axis point of said anchor so as to be singularly displayed on said screen upon demand through said remote control, each of said menus containing selectable subject matter that is related to at least one of said television environments; and at least one media control bar that is selectively pivotable about and extendable from said axis point of said anchor so as to be displayed on said screen upon demand through said remote control.

7. An on-screen device as claimed in claim 6, wherein said anchor has an advertisement banner that is displayed thereon anchor is selectively displayed on said screen.

8. An on-screen device as claimed in claim 6, wherein said on-screen device further comprises means for scrolling through said menus and also means for scrolling through subject-matter options available in said menus by using said remote control.

9. An on-screen device as claimed in claim 6, wherein said menus contain subject matter relating to at least one television environment selected from the group consisting of a live television broadcast, Internet services, informational services, a digitally recorded video, and a program guide.

10. An on-screen device as claimed in claim 6, wherein said menus include at least one personalized menu having selections that are selected and set by a user through selections made from a master menu.

11. A method for navigating through and manipulating media in multiple television environments, said method comprising the steps of:
(a) activating a visible anchor device having an axis point about which a menu from a plurality of menus is selectively pivoted and from which said menu is extended and displayed on a television screen, each of said menus respectively having a plurality of selectable options that are related to a at least one of said television environments;
(b) selecting an option from said plurality of selectable options as visibly displayed on said menu, said option being utilized for manipulating media that is available in at least one of said television environments corresponding to said menu; and
(c) deactivating said anchor device so that said anchor device along with said menu is no longer visibly displayed on said television screen.

12. A method as claimed in claim 11, wherein steps of activating and deactivating the anchor device, selecting a menu, and selecting an option (a), (b), and (c) are at least partially accomplished by pressing a button on a remote control.

13. A method as claimed in claim 11, wherein step (a) is at least partially accomplished by displaying a menu related to an existing television environment.

14. A method as claimed in claim 13, wherein said method further comprises the step of:
selecting a different menu from said plurality of menus to pivot about and visually extend from said anchor device, said different menu being related to a television environment that is different from said existing television environment.

15. A method as claimed in claim 14, wherein said method further comprises the steps of:
maintaining said existing television environment;
reactivating said anchor device; and
displaying the menu last displayed before reactivating said anchor device.

16. A method as claimed in claim 11, wherein said method further comprises the steps of:
selecting a settings menu from said anchor device;
selecting desired options from said settings menu; and
storing said desired options as selected in a personalized menu; and
displaying said personalized menu upon activation of said anchor device.

17. An activatable pop-up menu system comprising:
a screen;
an oblong anchor having an axis point at one end and a plurality of selectable menus associated therewith, said anchor being selectively displayed on said screen;
an elongate selected menu pivotally attached and extended from said axis point of said anchor so as to be displayed on said screen; and
a plurality of functional options displayed in said selected menu and on said screen;
wherein said anchor and said selected menu are shaped so as to visibly resemble a handle and a knife blade respectively of a conventional pocketknife on said screen.

18. An activatable pop-up menu system as claimed in claim 17, wherein said anchor has an advertisement banner that is displayed thereon when said anchor is selectively displayed on said screen.

19. An activatable pop-up menu system as claimed in claim 17, wherein said pop-up menu system further comprises means for scrolling through said selectable menus and also means for scrolling through said functional options.

20. An activatable pop-up menu system as claimed in claim 17, wherein said selectable menus contain subject matter relating to at least one television environment selected from the group consisting of a live television broadcast, Internet services, informational services, digitally recorded video, and a program guide.

21. An activatable pop-up menu system as claimed in claim 17, wherein said selectable menus include at least one personalized menu having stored selections that are set by a user through selections made from a master menu.

22. An on-screen navigation device as claimed in claim 1, wherein said oblong anchor is shaped so as to visibly resemble a handle of a conventional pocketknife on said display medium, and at least one of said elongate menus is shaped so as to visibly resemble a knife blade of said conventional pocketknife on said display medium.

23. An on-screen navigation device as claimed in claim 1, wherein said navigation device further comprises a media control bar that is selectively pivotable about and extendable from said axis point of said anchor so as to be displayed on said display medium upon demand through said remote control.

24. An on-screen navigation device as claimed in claim 23, wherein said media control bar is operable to facilitate the controlled play of music or video on said media system.

25. An on-screen navigation device as claimed in claim 23, wherein said media control bar is shaped so as to visibly resemble a knife blade, a bottle opener, or a can opener on said display medium.

* * * * *